United States Patent
Schmitt

(10) Patent No.: US 10,099,665 B2
(45) Date of Patent: Oct. 16, 2018

(54) METHOD FOR PREVENTING A MOTOR VEHICLE FROM ROLLING OFF

(71) Applicant: Schaeffler Technologies AG & Co. KG, Herzogenaurach (DE)

(72) Inventor: Werner Schmitt, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 285 days.

(21) Appl. No.: 15/111,958

(22) PCT Filed: Jan. 22, 2015

(86) PCT No.: PCT/DE2015/200015
§ 371 (c)(1),
(2) Date: Jul. 15, 2016

(87) PCT Pub. No.: WO2015/117605
PCT Pub. Date: Aug. 13, 2015

(65) Prior Publication Data
US 2016/0347292 A1  Dec. 1, 2016

(30) Foreign Application Priority Data
Feb. 5, 2014  (DE) .................. 10 2014 202 010

(51) Int. Cl.
| F16H 61/16 | (2006.01) |
| B60T 7/12 | (2006.01) |
| F16H 59/54 | (2006.01) |
| F16H 61/20 | (2006.01) |
| F16H 61/22 | (2006.01) |

(Continued)

(52) U.S. Cl.
CPC .............. *B60T 7/12* (2013.01); *B60T 13/662* (2013.01); *F16H 59/54* (2013.01); *F16H 61/16* (2013.01); *F16H 61/20* (2013.01); *F16H 61/22* (2013.01); *F16H 61/688* (2013.01); *F16H 2061/207* (2013.01); *F16H 2061/223* (2013.01)

(58) Field of Classification Search
CPC .... F16H 61/22; F16H 2061/223; F16H 61/16; F16H 2061/161; F16H 61/688; F16H 59/54; F16H 2061/207
See application file for complete search history.

(56) References Cited

U.S. PATENT DOCUMENTS 5,042,133 A * 8/1991 Peterson ............... B60R 25/003
29/404
5,089,965 A * 2/1992 Braun ................. F16H 61/0248
477/125

(Continued)

FOREIGN PATENT DOCUMENTS

| CN | 1609480 | 4/2005 |
| CN | 101535686 | 9/2009 |

(Continued)

*Primary Examiner* — Sherry L Estremsky
(74) *Attorney, Agent, or Firm* — Volpe and Koenig, P.C.

(57) ABSTRACT

The invention relates to a method for preventing a motor vehicle from rolling away, in which the motor vehicle includes an automated manual transmission, preferably a dual-clutch transmission. In the method in which a vehicle of this type is reliably prevented from rolling away, the NEUTRAL selector lever position is engaged only when the motor vehicle is at a standstill and a motor vehicle brake has been actuated.

11 Claims, 2 Drawing Sheets

(51) Int. Cl.
*F16H 61/688* (2006.01)
*B60T 13/66* (2006.01)

(56) References Cited

U.S. PATENT DOCUMENTS

| | | | |
|---|---|---|---|
| 5,388,477 A * | 2/1995 | Frei | F16H 59/044 |
| | | | 74/473.12 |
| 6,679,810 B1 | 1/2004 | Boll et al. | |
| 7,203,585 B2 | 4/2007 | Suzuki | |
| 8,406,975 B2 | 3/2013 | Ishiwada | |
| 8,682,552 B2 | 3/2014 | Tsutsui et al. | |
| 9,091,341 B2 * | 7/2015 | Watanabe | F16H 63/18 |
| 2006/0172855 A1 | 8/2006 | Pollak et al. | |
| 2014/0013890 A1 | 1/2014 | Kim et al. | |

FOREIGN PATENT DOCUMENTS

| | | |
|---|---|---|
| CN | 102741594 | 10/2012 |
| DE | 19949203 | 4/2000 |
| DE | 10059276 | 6/2001 |
| DE | 102008000749 | 9/2009 |
| EP | 1155899 | 11/2001 |
| EP | 1681497 | 7/2006 |

* cited by examiner

METHOD FOR PREVENTING A MOTOR VEHICLE FROM ROLLING OFF

BACKGROUND

The invention relates to a method for preventing a motor vehicle from rolling away, wherein the motor vehicle comprises an automated manual transmission, preferably a dual-clutch transmission, which engages a gear when the selector lever is in a NEUTRAL position.

DE 100 59 276 A1 makes known a method for operating a motor vehicle, in which a vehicle brake must be actuated in order to set a transmission ratio in a transmission. If the selector lever is in the neutral position at this time, a transmission ratio is not set. If the selector lever is moved from the neutral position into a drive position, a check is carried out to determine whether or not the vehicle brake has been actuated. If the vehicle brake has been actuated, a corresponding transmission ratio is set. If the vehicle brake is not actuated, a transmission ratio is not set.

EP 1 155 899 B1 discloses a method for detecting an intention of a driver to start driving in the case of a motor vehicle equipped with a self-shifting transmission. In this case, the electronic control of a self-shifting transmission in the motor vehicle detects, by way of the selector lever being moved from NEUTRAL into a driving gear, that the driver wants to start driving, even if a service brake has not been actuated before the driving gear is selected. In this case, it is still ensured, however, that an inadvertent displacement of the selector lever will not initiate driving.

Automated manual transmission systems that also have a gear engaged in the NEUTRAL selector lever position are known. This gear is coupled via an overrunning clutch to the transmission output and is not actuated by the transmission control unit. This means the transmission control unit has actively engaged NEUTRAL in all sub-transmissions. The transmission input shaft is nevertheless coupled to the transmission output shaft via an overrunning clutch. Next, with the engine running and the clutch disengaged, if a drag torque is transmitted by the clutch to the transmission input shaft, then, depending on the level of the drag torque and the particular transmission ratio of the engaged gear, the motor vehicle is nevertheless accelerated due to the transmission ratio of the engaged gear. In the following, the drag torque should be considered to be a torque that can be transmitted even when the clutch is disengaged, which is the case, in particular, with wet clutches.

Such a movement of the motor vehicle is a safety-critical situation, however, which must be avoided in any event, in particular when the vehicle driver parks the motor vehicle with the selector lever in the NEUTRAL position and leaves the motor vehicle.

SUMMARY

The issue addressed by the invention is therefore that of providing a method in which the motor vehicle, which comprises an automated manual transmission having a gear engaged when the selector lever is in the NEUTRAL position, is reliably prevented from rolling away.

According to the invention, this issue is addressed by way of the NEUTRAL selector lever position being engaged only when the motor vehicle is at a standstill and a brake of the motor vehicle has been actuated. It is thereby ensured, in particular by the locking of the brake, that a movement of the motor vehicle is prevented even when the engine is running and torque is inadvertently transmitted from the engine to the transmission and further to the drive wheels of the motor vehicle.

Advantageously, the NEUTRAL selector lever position can be engaged only when the engine speed is zero. It is thereby ensured that the motor vehicle is at a standstill, which can be easily detected via the engine speed.

In one embodiment, the brake is automatically engaged when the vehicle is at a standstill. As a result, the motor vehicle is prevented from rolling away, independently of the driver's intention, thereby reliably preventing a safety-critical situation caused by the motor vehicle.

In one variant, the engagement of the brake is requested by a control unit of the motor vehicle, which monitors the operating state of the motor vehicle. By means of the monitoring of the operating state of the motor vehicle by the control unit, which detects whether the NEUTRAL selector lever position can be engaged, a check is carried out to determine whether the motor vehicle is also actually at a standstill. If this is the case, a signal to activate the brake is output by the control unit to the brake actuator of the motor vehicle. This is carried out automatically and without any action from the driver.

In one embodiment, the operating state of the motor vehicle is monitored on the basis of the selector lever position and/or the engine speed and/or a status of the brake. As a result, the control unit reliably detects whether the motor vehicle is in a situation in which the engagement of the selector lever in the NEUTRAL position is permitted.

In a further variant, a deactivation of the brake is requested by the control unit, which is monitoring the operating state of the motor vehicle, when the selector lever is moved into a position other than NEUTRAL. It is thereby ensured, in the event of intentional further travel or an initiation of driving of the motor vehicle, that the motor vehicle is very quickly brought into the desired drive-away state without the vehicle driver noticing anything.

In order to handle driving situations in which the automatic prevention of the motor vehicle rolling away could cause problems, the automatic activation of the brake is prevented by a manually actuated element on the selector lever. Such a situation can be necessary, for example, when the motor vehicle is being rocked out of an embedded position in snow, in which case the selector lever must be quickly switched from R (reverse) to D (forward).

One refinement of the invention relates to a method for preventing a motor vehicle from rolling away, wherein the motor vehicle comprises an automated manual transmission, preferably a dual-clutch transmission, which engages a gear when the selector lever is in a NEUTRAL position. In such a method, an acoustic and/or visual warning signal is output when the NEUTRAL selector lever position is selected while the engine of the motor vehicle is running and the brake is deactivated. It is thereby brought to the attention of the vehicle driver that the motor vehicle is not prevented from driving away and that additional actions are required of said vehicle driver in order to engage protection against driving away.

Advantageously, the NEUTRAL selector lever position is mechanically blocked when the engine of the motor vehicle is running and a brake has not been engaged at a standstill. It is thereby reliably ensured that the driver does not leave the vehicle without having carried out the required safety precautions.

In one embodiment, the visual and/or acoustic warning signal is output if the brake is manually deactivated while the engine of the motor vehicle is running. In this case as well, the driver is signaled that the vehicle, with the brake deactivated, can inadvertently leave its parked position.

BRIEF DESCRIPTION OF THE DRAWINGS

The invention provides for numerous embodiments. One of these is described in greater detail with reference to the figures depicted in the drawings.

In the drawings.

DETAILED DESCRIPTION OF THE PREFERRED EMBODIMENTS

Figure 1:
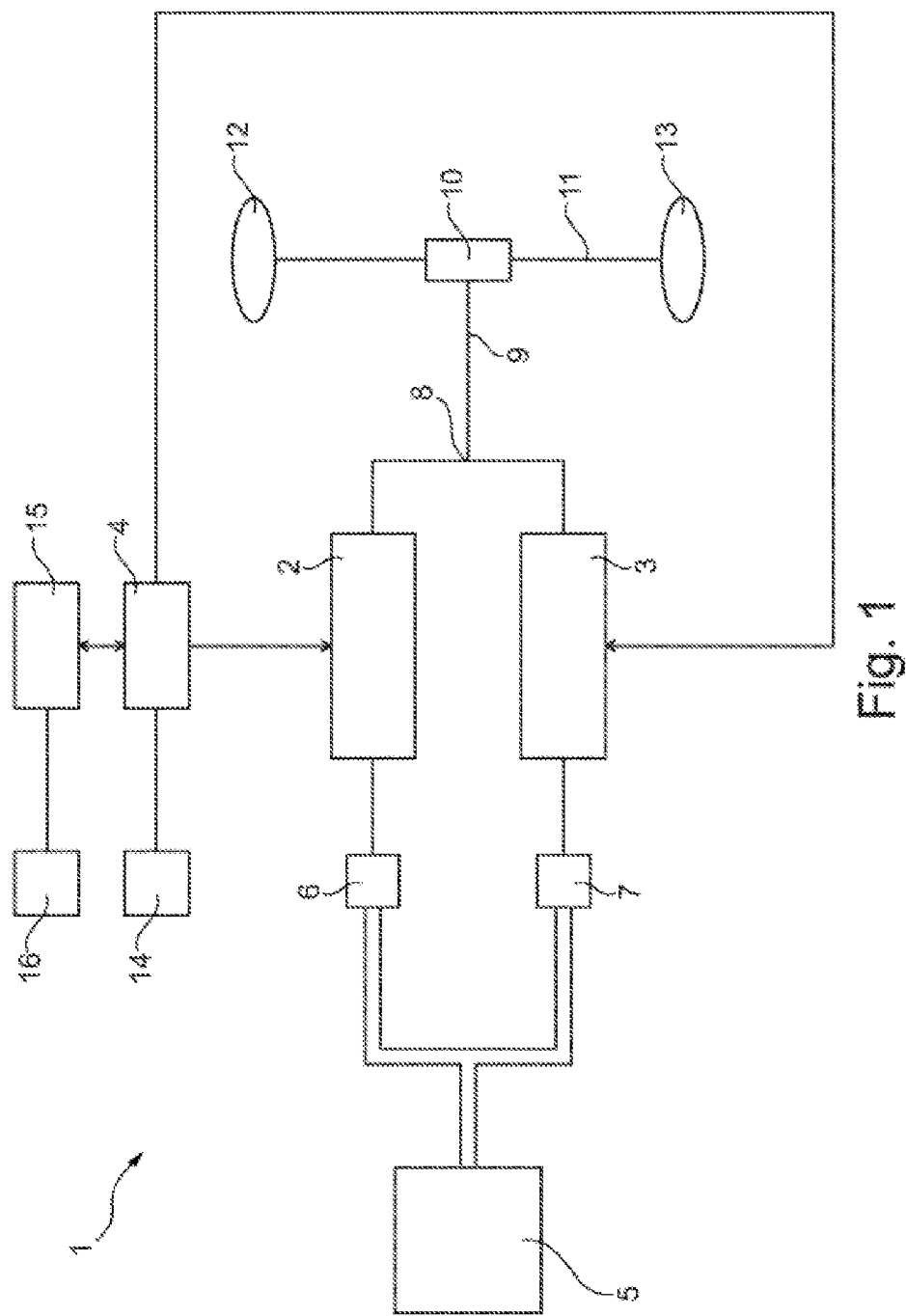
FIG. 1: shows a basic illustration of a drive train of a motor vehicle comprising a dual-clutch transmission.

FIG. 1 shows a drive train 1 of a motor vehicle comprising a dual-clutch transmission. The dual-clutch transmission is an automated manual transmission, which, by means of two sub-transmissions 2, 3, provides for a fully automatic gear shift without an interruption of tractive force. A transmission control unit 4 selects the gears automatically or according to a driver request within the scope of the permitted speed ranges. One sub-transmission 2 comprises the even gears, while the other sub-transmission 3 comprises the odd gears.

The transmission of the torque from an internal combustion engine 5 to the input of the transmission is carried out via two clutches 6, 7, wherein each clutch 6, 7 connects one of the sub-transmissions 2, 3 to the internal combustion engine 5. According to the function of the dual-clutch transmission, one clutch 6 engages while the other clutch 7 simultaneously disengages. Therefore, one gear can be engaged and a second gear can be prepared for engagement. In this case, the gears are shifted only during the disengagement and engagement of the two clutches 6, 7.

The two sub-transmissions 2, 3 operate on a common transmission output 8. A driven shaft 9 of the transmission extends from the transmission output 8 to a differential 10, which is connected to an axle 11. Drive wheels 12, 13 of the motor vehicle are fastened on the axle 11. The electronic transmission control unit 4 makes a decision, in accordance with the shifting programs, primarily in accordance with the speed of the internal combustion engine 5 and the driver request as indicated by the placement of a selector lever 14, regarding the gear selection and controls the shifting processes. The transmission control unit 4 is connected to the selector lever 14, which is actuated by the vehicle user, an integrated, non-illustrated actuator system actuates the sub-transmissions 2, 3 and the clutch 6, 7 electromechanically or hydraulically.

In the present case, the transmission control unit 4 is connected to a vehicle control unit 15, which monitors the operating state of at least one brake 16 of the motor vehicle. Advantageously, the parking brake is monitored in this case.

Figure 2:
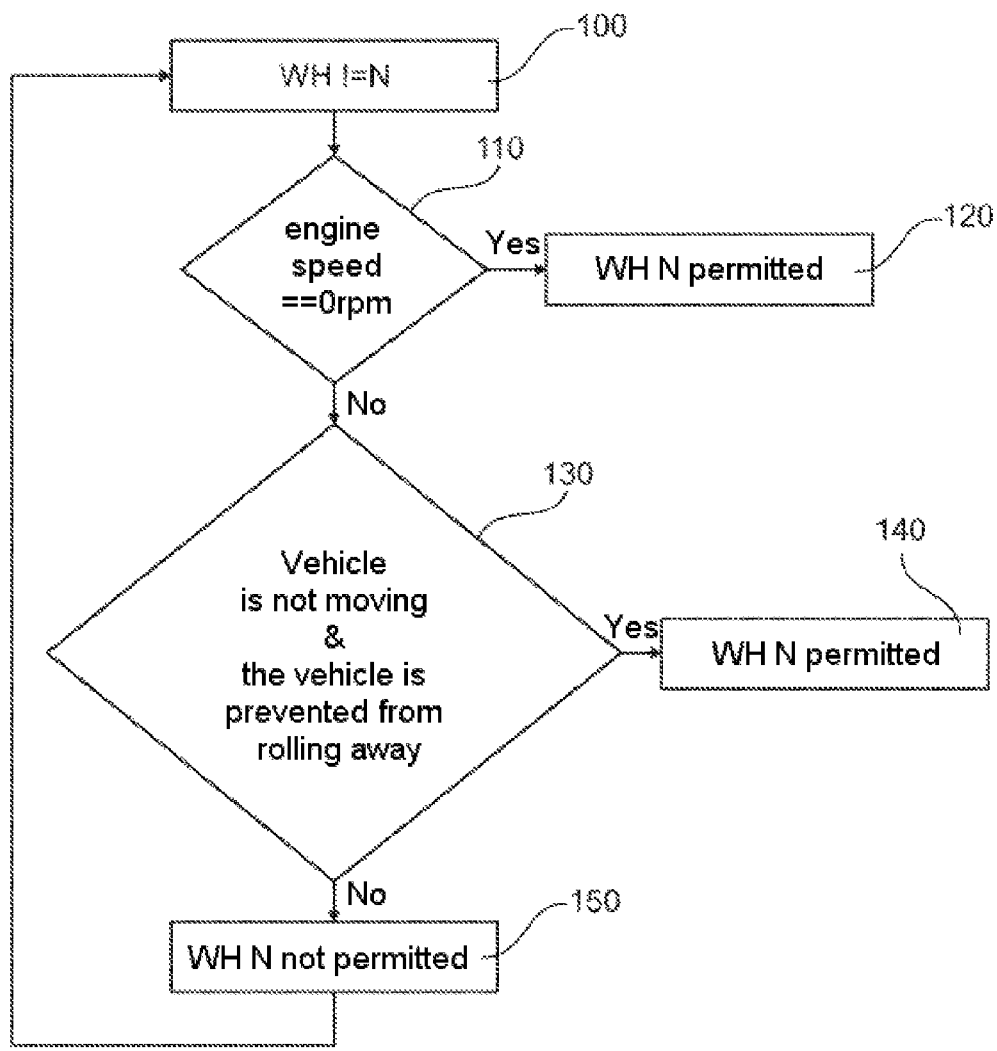
FIG. 2: shows an exemplary embodiment of the method according to the invention.

One exemplary embodiment of the method according to the invention will be explained in greater detail with reference to FIG. 2. In block 100, the selector lever 14 is in a position other than NEUTRAL, which means the motor vehicle is in the driving mode. If it is determined in block 110 that the engine speed is zero, the transmission control unit 4 will permit an engagement of the NEUTRAL selector position lever WH N (block 120). However, if it is determined in block 110 that the engine speed is not zero, a check is carried out in block 130 to determine whether the motor vehicle is moving and whether, simultaneously, the motor vehicle is prevented from rolling away. In this case, prevention from rolling away is considered to be an activation of one or more brakes of the motor vehicle. If this condition is met, the process skips to block 140, where the NEUTRAL selector lever position WH N can be engaged. However, if it is determined that the vehicle is still moving and/or a brake has not been engaged, then, in block 150, the NEUTRAL selector lever position WH N is not permitted.

As a result of the solution provided, a motor vehicle is prevented from rolling away if the clutch has a drag torque even in the disengaged state and, therefore, it can be expected that the motor vehicle will move when the selector lever is in the NEUTRAL position WH N.

LIST OF REFERENCE NUMBERS 1 drive train
2 sub-transmission
3 sub-transmission
4 transmission control unit
5 internal combustion engine
6 clutch
7 clutch
8 transmission output
9 driven shaft
10 differential
11 axle
12 drive wheel
13 drive wheel
14 selector lever
15 vehicle control unit
16 brake
WH N NEUTRAL selector lever position

The invention claimed is:

1. A method for preventing a motor vehicle from rolling away, wherein the motor vehicle comprises an automated manual transmission, which engages a gear when a selector lever is in a NEUTRAL position, the method comprising engaging the NEUTRAL selector lever position only when the motor vehicle is at a standstill and after actuating a brake of the motor vehicle.

2. The method as claimed in claim 1, further comprising arranging the NEUTRAL selector lever position to be engageable only when an engine speed is zero.

3. The method as claimed in claim 1, further comprising automatically engaging the brake when the vehicle is at a standstill.

4. The method as claimed in claim 3, further comprising a control unit of the motor vehicle requesting the engagement of the brake, said control unit monitoring an operating state of the motor vehicle.

5. The method as claimed in claim 4, further comprising monitoring the operating state of the motor vehicle on the basis of at least one of the selector lever position, the engine speed, or a status of the brake.

6. The method as claimed in claim 4, further comprising the control unit requesting a deactivation of the brake when the selector lever is moved into a position other than the NEUTRAL position.

7. The method as claimed in claim 4, wherein an automatic activation of the brake is prevented by a manually actuated element on the selector lever.

8. The method of claim 1, wherein the automated manual transmission is a dual clutch transmission.

9. A method for preventing a motor vehicle from rolling away, wherein the motor vehicle comprises an automated manual transmission which engages a gear when a selector lever is in a NEUTRAL position, the method comprising outputting at least one of an acoustic or visual warning signal when the NEUTRAL selector lever position is selected while an engine of the motor vehicle is running and the brake is deactivated.

10. The method as claimed in claim 9, further comprising mechanically blocking the NEUTRAL selector lever position when the engine of the motor vehicle is running and the brake has not been actuated.

11. The method as claimed in claim 9, further comprising outputting at least one of a visual or acoustic warning signal if the brake is manually deactivated while the engine of the motor vehicle is running.

* * * * *